(12) United States Patent
Hwang et al.

(10) Patent No.: US 8,188,954 B2
(45) Date of Patent: May 29, 2012

(54) DISPLAY DEVICE AND MOBILE TERMINAL HAVING THE SAME

(75) Inventors: Hyun Ha Hwang, Seoul (KR); Seung Gon Kang, Hwasung-shi (KR)

(73) Assignee: LG Display Co., Ltd., Seoul (KR)

( * ) Notice: Subject to any disclaimer, the term of this patent is extended or adjusted under 35 U.S.C. 154(b) by 553 days.

(21) Appl. No.: 11/997,722

(22) PCT Filed: Aug. 1, 2007

(86) PCT No.: PCT/KR2007/003701
§ 371 (c)(1),
(2), (4) Date: Feb. 1, 2008

(87) PCT Pub. No.: WO2008/020684
PCT Pub. Date: Feb. 21, 2008

(65) Prior Publication Data
US 2009/0140962 A1  Jun. 4, 2009

(30) Foreign Application Priority Data
Aug. 17, 2006  (KR) .......................... 10-2006-0077453

(51) Int. Cl.
G09G 3/36  (2006.01)

(52) U.S. Cl. ............................................. 345/87; 349/61
(58) Field of Classification Search .............. 345/61–63, 345/87; 136/259; 349/62
See application file for complete search history.

(56) References Cited

U.S. PATENT DOCUMENTS

| | | | |
|---|---|---|---|
| 7,030,945 B2 | 4/2006 | Umemoto et al. | |
| 7,733,439 B2* | 6/2010 | Sampsell et al. | 349/62 |
| 2002/0064037 A1 | 5/2002 | Lee et al. | |
| 2005/0001796 A1* | 1/2005 | Liu | 345/87 |
| 2007/0139324 A1* | 6/2007 | Lai et al. | 345/87 |
| 2009/0126792 A1* | 5/2009 | Gruhlke et al. | 136/259 |

FOREIGN PATENT DOCUMENTS
KR  10-2006-0060217 A  6/2006
* cited by examiner

Primary Examiner — Quan-Zhen Wang
Assistant Examiner — Yuk Chow
(74) Attorney, Agent, or Firm — Birch, Stewart, Kolasch & Birch, LLP

(57) ABSTRACT

Provided are a display device and a mobile terminal having the same. The display device includes a transflective liquid crystal panel, a first light unit on a rear side of the transflective liquid crystal panel, and a second light unit on a front side of the transflective liquid crystal panel.

12 Claims, 4 Drawing Sheets

[Fig. 1]
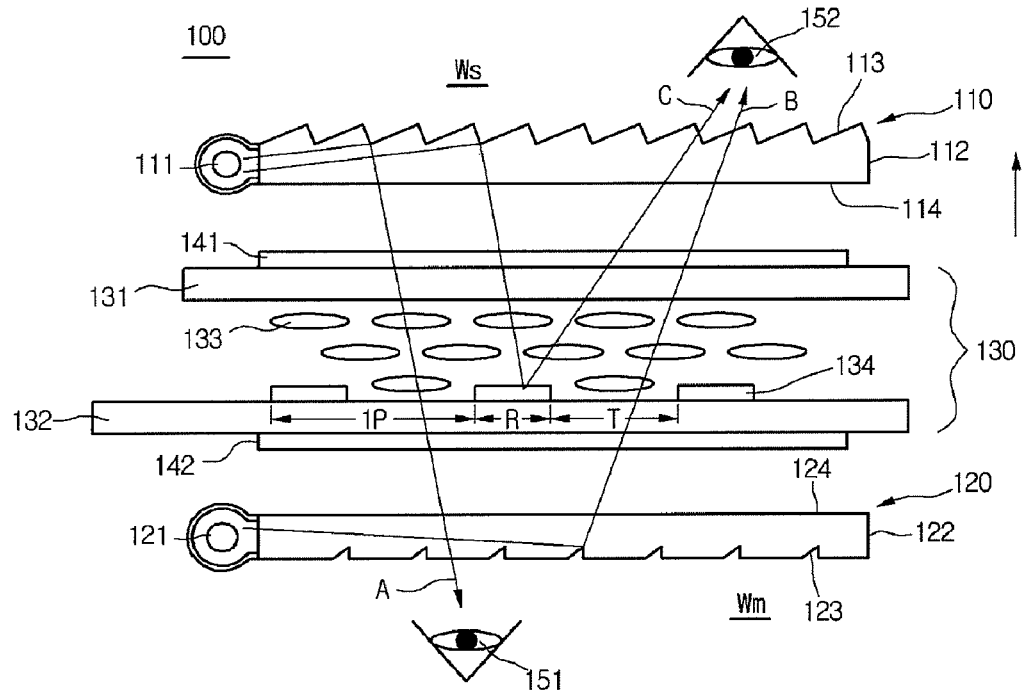
[Fig. 2]
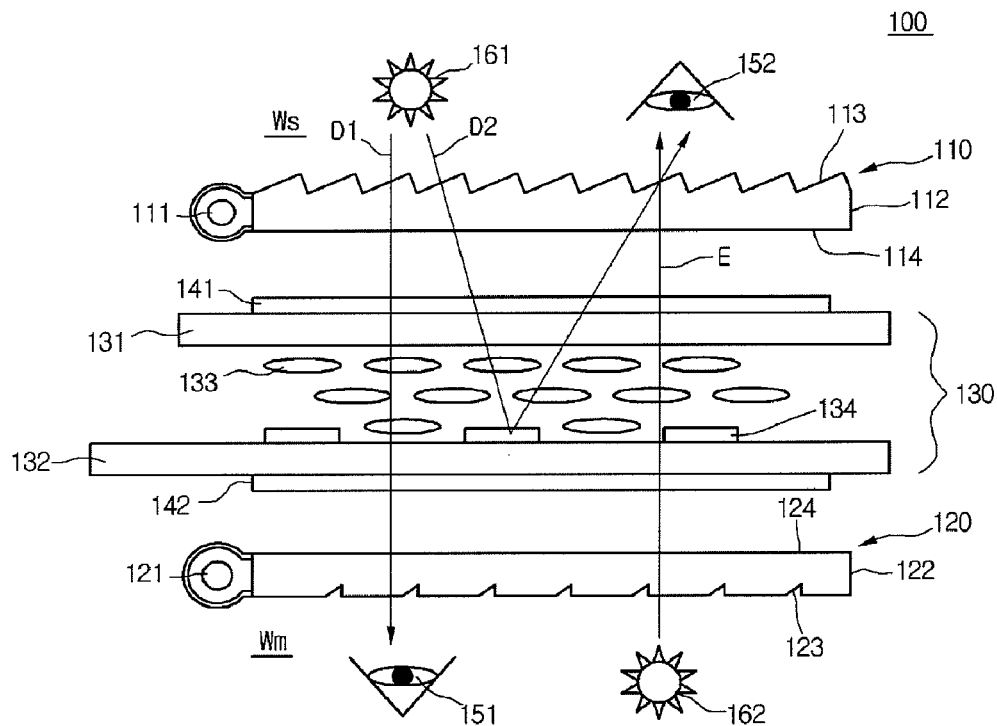

[Fig. 3]
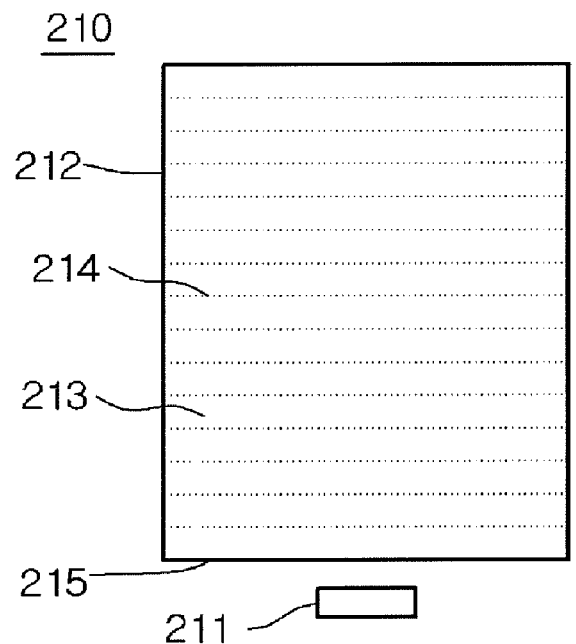
[Fig. 4]
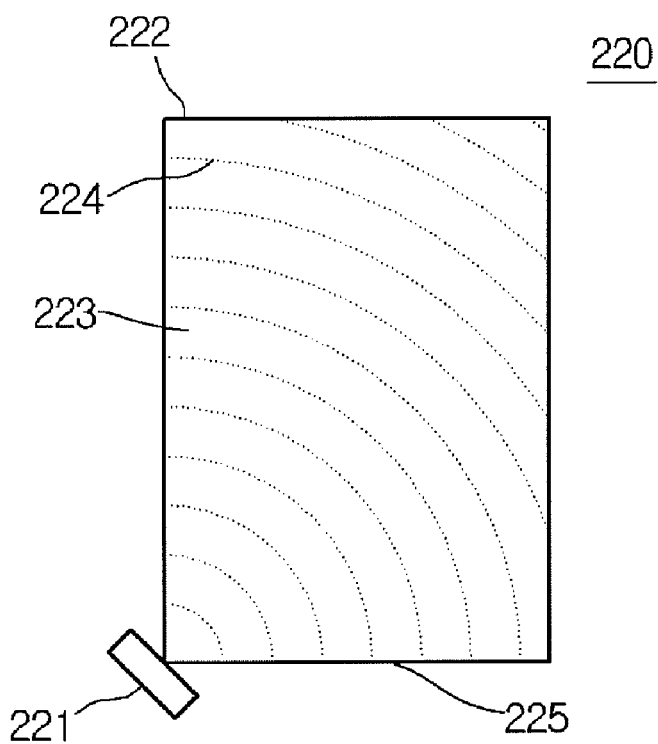

[Fig. 5]
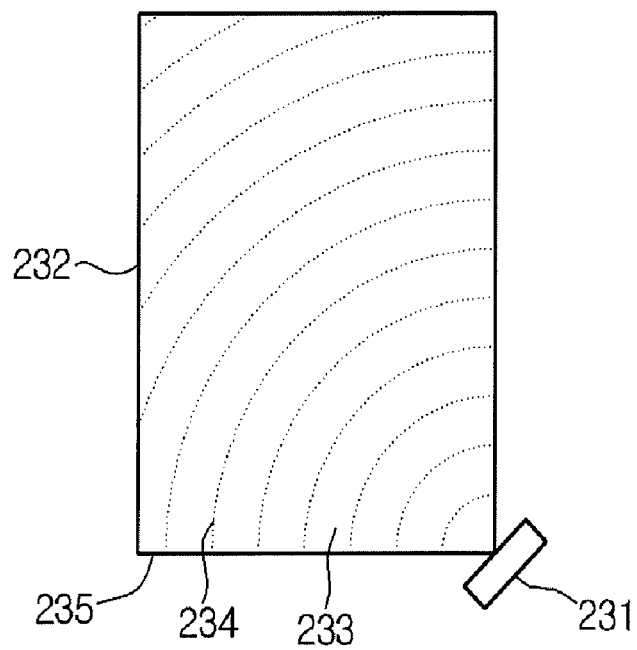
[Fig. 6]
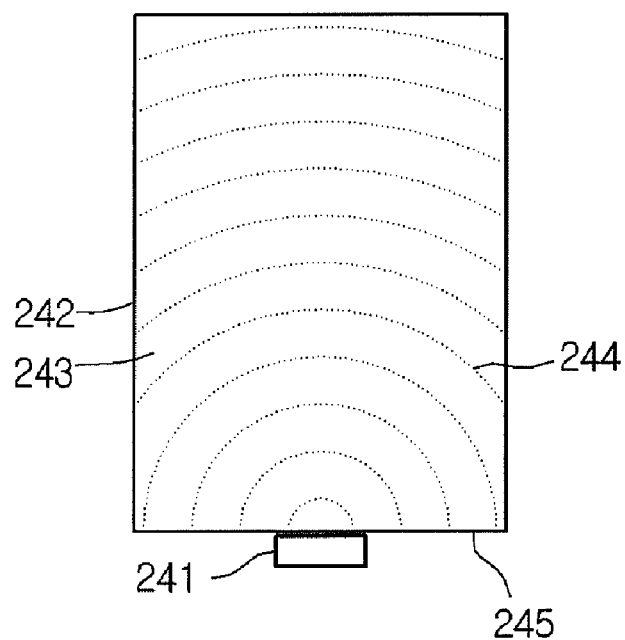

[Fig. 7]
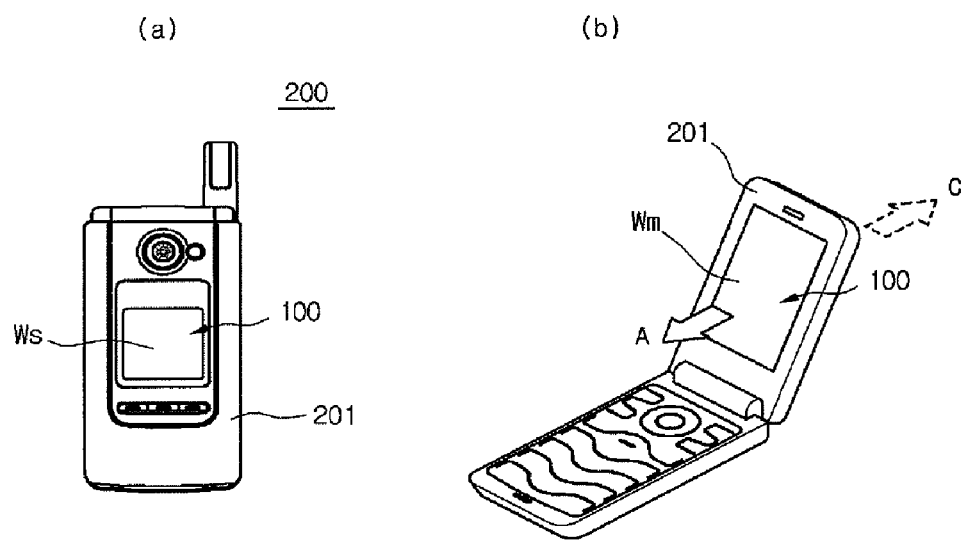

DISPLAY DEVICE AND MOBILE TERMINAL HAVING THE SAME

CROSS-REFERENCE TO RELATED APPLICATION

This application is the U.S. national stage application of International Patent Application No. PCT/KR2007/003701, filed Aug. 1, 2007, the disclosure of which is hereby incorporated by reference in its entirety.

TECHNICAL FIELD

Embodiments relate to a display device and a mobile terminal having the same.

BACKGROUND ART

Examples of display devices include cathode ray tubes (CRTs), liquid crystal display (LCD) devices using an optical effect of electric field, plasma display panels (PDPs) using gas discharge, and electro luminescence display (ELD) devices using a light emitting effect of an electric field.

Among them, research on the LCD devices is in active progress.

Since the LCD devices have advantages of a small size, lightweight, low power consumption, and full colors to overcome limitations of CRTs, fields to which the LCD devices are applied gradually extend.

Since the LCD devices are light receiving devices adjusting an amount of light received from the outside to display an image, they require a separate external light source such as a light unit.

DISCLOSURE

Technical Problem

Embodiments provide a display device for displaying an image in both directions, and a mobile terminal having the same.

Embodiments provide a display device including light units on both sides of a transflective liquid crystal (LC) panel so that an image is displayed on both sides of the transflective LC panel, and a mobile terminal having the display device.

Embodiments provide a display device that can provide an optical shutter to an outside of at least one light unit to selectively block light leaking to the outside, and a mobile terminal having the display device.

Technical Solution

An embodiment provides a display device comprising; a transflective liquid crystal panel; a first light unit on a rear side of the transflective liquid crystal panel; and a second light unit on a front side of the transflective liquid crystal panel.

An embodiment provides a display device comprising: a transflective liquid crystal panel; a first light unit on a rear side of the transflective liquid crystal panel, the first light unit including a first light emitting part on one end, and a first light guide plate on a light emitting region of the first light emitting part; and a second light unit on a front side of the transflective liquid crystal panel, the second light unit including a second light emitting part on one end, and a second light guide plate having prism patterns different from those of the first light guide plate, and the second light guide plate being on a light emitting region of the second light emitting part.

An embodiment provides a mobile terminal comprising: a transflective liquid crystal panel: a first light unit on a rear side of the transflective liquid crystal panel; a second light unit on a front side of the transflective liquid crystal panel; and a control unit for controlling driving of at least one of the first light unit and the second light unit to control a display mode of the transflective liquid crystal panel.

The details of one or more embodiments are set forth in the accompanying drawings and the description below. Other features will be apparent from the description and drawings, and from the claims.

Advantageous Effects

In a display device according to an embodiment and a mobile terminal having the same, an image can be displayed on both sides using a plurality of light units and a transflective liquid crystal panel.

Also, a main screen and a sub-screen can be made to have the same size using a transflective liquid crystal panel.

Also, the quality of a sub-screen can be improved to a level of the quality of a main screen using a transflective liquid crystal panel.

Also, since an external light source can be used through two transparent light units, power consumption can be reduced.

Also, since an image can be displayed on both sides using one liquid crystal panel, manufacturing costs can be reduced in comparison with the case where two panels are used.

DESCRIPTION OF DRAWINGS

FIG. 1 is a view illustrating a liquid crystal panel according to an embodiment.

FIG. 2 is a view illustrating a display mode using an external light source in the liquid crystal display device of FIG. 1.

FIG. 3 is a view illustrating first embodiment of a light unit in the liquid crystal display device of FIG. 1.

FIG. 4 is a view illustrating second embodiment of a light unit in the liquid crystal display device of FIG. 1.

FIG. 5 is a view illustrating third another embodiment of a light unit in the liquid crystal display device of FIG. 1.

FIG. 6 is a view illustrating fourth embodiment of a light unit in the liquid crystal display device of FIG. 1.

FIG. 7 is a view illustrating a mobile terminal having the liquid crystal display device of FIG. 1 is used.

BEST MODE

A liquid crystal display (LCD) device will be described with reference to the accompanying drawings.

FIG. 1 is a view illustrating a liquid crystal panel according to an embodiment.

Referring to FIG. 1, the LCD device 100 includes a first light unit 110, a second light unit 120, a transflective LC panel 130, a first polarizer 141, and a second polarizer 142.

The first light unit 110 is disposed on the rear side of the transflective LC panel 130, and the second light unit 120 is disposed on the front side of the transflective LC panel 130. The first and second light units 110 and 120 illuminate plane light on the rear side or the front side of the transflective LD panel 130.

The first light unit 110 includes a first light emitting part 111 and a first light guide plate 112. The second light unit 120 includes a second light emitting part 121 and a second light guide plate 122. The first and second light emitting parts 111 and 121 selectively use a tube shaped light emitting lamp such as a light emitting diode (LED), a cold cathode fluorescence tube (CCFT), a hot cathode fluorescence tube (HCFT). The first and second light emitting parts 111 and 121 are disposed at one ends of the first and second light guide plates 112 and 122, respectively to generate light, and provide the generated light onto the first and second light guide plates 112 and 122, respectively. Here, a light source of the first light emitting part 111 can be the same as or different from a light source of the second light emitting part 121, but is not limited thereto.

The first light guide plate 112 and the second light guide 122 can be formed of a transparent acryl resin, a polycarbonate-based resin, an epoxy resin, or a prism.

The first light guide plate 112 includes a planarized surface 114 facing the rear side of the transflective LC panel 130, and an uneven surface 113 corresponding to the opposite side of the planarized surface 114. The uneven surface 113 includes successive prism patterns inclined in a predetermined direction with respect to the planarized surface 114.

The second light guide plate 122 includes a planarized surface 124 facing the front side of the transflective LC panel 130, and an uneven surface 123 corresponding to the opposite side of the planarized surface 124. The uneven surface 123 includes successive prism patterns inclined in a predetermined direction with respect to the planarized surface 124. Here, the uneven surface 113 of the first light guide plate 112 can have the prism patterns different from those of the uneven surface 123 of the second light guide plate 122.

Light incident onto the first light guide plate 112 from the first light emitting part 111 is guided along the first light guide plate 112, reflected by the uneven surface 113, and emitted to the planarized surface 114. Light incident onto the second light guide plate 122 from the second light emitting part 121 is guided along the second light guide plate 122, reflected by the uneven surface 123, and emitted to the planarized surface 124.

The first light unit 110 is provided as a light source for displaying of a main screen Wm and/or sub-screen Ws.

The transflective LC panel 130 includes a transparent first substrate 131, a transparent second substrate 132 facing each other, and an LC layer 133 interposed between the first and second substrates 131 and 132. The first substrate 131 can be realized as a color filter array substrate for example. The second substrate 132 can be realized as a thin film transistor (TFT) array substrate for example. Also, the first substrate 131 can be realized as a TFT array substrate. The second substrate 132 can be realized as a color filter array substrate. Also, the first or second substrate can be realized in a color filter on array (COA) structure where color filter array and a TFT array have been realized in an integral type. The LC layer 133 includes cells having an angle of 90° on two transparent electrodes that have been aligned such that the lengthwise axes of LC molecules are parallel to the planes of the electrodes. When nematic LCs are dropped into the LC layer 133, the lengthwise axes of the LC molecules are continuously twisted by 90° from one electrode to the other electrode. Here, though twist nematic (TN) mode has been exemplarily described for the LC, the LC panel can be realized as an LC panel to which an electrically controlled birefringence (ECB) mode, an optically compensation bend (OCB) mode, an in plane switching (IPS) mode, or a vertical alignment (VA) mode is applied. The LC panel can operate in a normally black mode or normally white mode depending on a display realizing type.

Also, reflectors 134 are formed on portions of the second substrate 132. The reflectors 134 is located in a reflection portion R of a region within one pixel region 1P where a transmission portion T and the reflection portion R are defined, and can serve as a black matrix with respect to light from the second light unit 120. Here, a color filter can be located in the transmission portion T. The first polarizer 141 can be attached on the rear side of the first substrate 131, and the second polarizer 142 can be attached on the front side of the second substrate 132. That is, the first and second polarizers 141 and 142 can be attached on both sides of the transflective LC panel 130.

The first and second polarizers 141 and 142 can include a polymer polarizing material for polarizing incident light and a tri-acetyl-cellulose (TAC) support on both sides of the polarizing material, for example. Also, an adhesive layer can be formed on the first and second polarizers 141 and 142 to attach the first and second polarizers 141 and 142 onto the first and second substrates 131 and 132, respectively. The transmission axes of the first and second polarizers 141 and 142 are formed to be perpendicular to each other.

A display mode of the LCD device will be described below.

A first display mode of the main screen Wm uses the first light unit 110. At this point, the second light unit 120 can be set to be on or off.

Light generated from the first light emitting part 111 of the first light unit 110 is reflected by the uneven surface 113 of the first light guide plate 112 and provided as plane light through the planarized surface 114. Light from the first light guide plate 112 passes through the transmission axis of the first polarizer 141, and passes through the first substrate 131, the LC layer 133, and the transmission portions T of the second substrate 132 of the transflective LC panel 130. Light A that has passed through the transflective LC panel 130 passes through the transmission axis of the second polarizer 142, and passes through the second light guide plate 122 of the second light unit 120. Accordingly, an image is displayed on the main screen Wm and can be viewed by a user 151. Here, a portion of light from the first light unit 110 is reflected by the reflectors 134 of the transflective LC panel 130, and the reflected light C passes through the LC layer 133, the first substrate 131, the first polarizer 141, and the first light guide plate 112 of the first light unit 110.

At this point, an image can be provided to another user 152 via the sub-screen Ws.

A second display mode of the sub-screen Ws can be performed using the second light unit 120 or both the first and second light units 110 and 120. Here, the display mode of the sub-screen Ws can uses only the second light unit 120. At this point, the first light emitting part 111 of the first light unit 110 is turned off.

Light B from the second light emitting part 121 of the second light unit 120 is provided as plane light from the second light guide plate 122. The light B from the second light unit 120 passes through the transmission axis of the second polarizer 142, and passes through the LC layer 133 and the first substrate 131 via the transmission portions T of the second substrate 132 of the transflective LC panel 130. Also, the light B that has passed through the transflective LC panel 130 passes through the transmission axis of the first polarizer 141, and passes through the first light guide plate 112 of the first light unit 110. Accordingly, light from the second light unit 120 passes through the transmission portions T of the transflective LC panel 130 to display the sub-screen Ws, thereby providing an image to the user 152.

At this point, a display mode of the sub-screen Ws uses the first light unit 110 and the second light unit 120.

A portion C of light from the first light unit 110 is reflected by the reflectors 134 of the transflective LC panel 130, and light from the second light unit 120 passes through the transmission portions T of the transflective LC panel 130. At this point, the light C reflected by the transflective LC panel and the transmitted light B display the sub-screen Ws through the LC layer 133, the first substrate 131, the first polarizer 141, and the first light guide 112 of the first light unit 110, thereby providing an image to the user 152.

The LCD device displays the sub-screen using the two light units 110 and 120 and the transflective LC panel 130 to provide more clear image quality. Also, the user can selectively use at least one of the two light units. Also, screen sizes of both sides can be made almost the same.

FIG. 2 is a view illustrating a third display mode using an external light source in the liquid crystal display device of FIG. 1.

Referring to FIG. 2, the first light unit 110 and/or the second light unit 120 are turned off during a third display mode using the external light sources 161 and 162. Here, the first and second light units 110 and 120 can be set to be turned off when the brightness of external light D1 and D2 are a predetermined brightness or more.

A display mode of the main screen Wm uses light incident from an external light 161 at the sub-screen Ws. External light D1 incident from the first light guide plate 112 of the first light unit 110 passes through the first polarizer 141, the transmission portions T of the LC panel 130, the second polarizer 142, and the second light guide plate 122 of the second light unit 120 to display an image on the main screen Wm.

A display mode of the sub-screen Ws can use external light incident from light sources 162 and 161 via the main screen Wm and the sub-screen Ws. External light E incident onto the main screen Wm passes through the second light guide plate 122 of the second light unit 120, the second polarizer 142, the transmission portions T of the transflective LC panel 130 to pass through the first polarizer 141 and the first light guide plate 112 of the first light unit 110. External light D2 incident onto the sub-screen Ws is reflected by the reflectors 134 of the transflective LC panel 130 to pass through the first light guide plate 112 of the first light unit 110. Accordingly, an image is displayed on the sub-screen Ws.

Since the external light is used without internal light sources, power consumption can be reduced.

Meanwhile, in an embodiment, prism patterns having shapes different from each other are formed on the uneven surfaces 113 and 123 at the opposite sides of the planarized surfaces 114 and 124 of the first light guide plate 112 of the first light unit 110, and the second light guide plate 122 of the second light unit 120, respectively. Patterns different from each other are disposed on the first and second light guide plates 112 and 122 of the first and second light units 110 and 120 facing each other to remove moire phenomenon that stripe patterns appear on a displayed screen. Here, the moire phenomenon denotes an interference fringe generated when two or more periodic patterns overlap each other, and means a phenomenon that when two or more gratings having similar intervals are disposed to overlap each other and light is illuminated thereto, separate stripe patterns having a large period different from the two gratings are generated.

To remove this moire phenomenon, the light units illustrated in FIGS. 3 to 6 can be applied.

FIGS. 3 to 6 are views illustrating embodiments of a light unit for providing different prism patterns of a light guide plate.

Referring to FIG. 3, a light unit 210 includes a light emitting part 211 and a light guide plate 212.

Prism patterns 214 of grating shapes arranged in a horizontal direction with a constant interval are formed in an uneven surface 213 of the light guide plate 212. The light emitting part 211 includes at least one LED disposed on the center of a light incident part 215 of the light guide plate 212, and can be realized as a tube shaped light emitting lamp, but is not limited thereto.

Referring to FIG. 4, a light unit 220 includes a light emitting part 221 disposed at the left corner of a light incident part 225 of a light guide plate 222. Prism patterns 224 spaced from each other with a constant interval and having a different curvature radius around the left corner of the light incident part 225 of the light guide plate 222 are formed in an uneven surface 223 of the light guide plate 222. That is, the prism patterns 224 of different curvatures are arranged in a concentric shape around the left corner of the light guide plate 222.

Referring to FIG. 5, a light unit 230 includes a light emitting part 231 disposed at the right corner of a light incident part 235 of a light guide plate 232. Prism patterns 234 spaced from each other with a constant interval and having a different curvature radius around the right corner of the light incident part 235 of the light guide plate 232 are formed in an uneven surface 233 of the light guide plate 232. That is, the prism patterns 234 of different curvatures are arranged in a concentric shape around the right corner of the light guide plate 232.

Referring to FIG. 6, a light unit 240 includes a light emitting part 241 disposed at the center of a light incident part 245 of a light guide plate 242.

Prism patterns 244 spaced from each other with a constant interval and having a different curvature radius around the center of the light incident part 245 of the light guide plate 242 are formed in an uneven surface 243 of the light guide plate 242. That is, the prism patterns 244 of different curvatures are arranged in a concentric shape around the center of the light incident part 245 of the light guide plate 242.

Here, since the concentric shaped prism patterns are provided to the light guide plate 242, the light guide plate 242 can more effectively guide or reflect light from the light emitting part to achieve a uniform brightness characteristic on the whole. Also, the prism patterns formed in the uneven surface of the light guide plate can be formed in various shapes or a period of various intervals.

Also, the light emitting part can be selectively disposed on light incident parts of the light guide plate where a maximum light output can be generated by the prism patterns of the light guide plate.

FIG. 7 is a view illustrating a mobile terminal having the liquid crystal display device of FIG. 1 is used.

Referring to FIG. 7, an LCD device 100 is provided to an upper main machine 201 of the mobile terminal 200. Referring to FIG. 7A, when the upper main machine 201 is closed, a portion C of light from the first light unit 110 that is reflected by the transflective LC panel 130, and a portion B of light from the second light unit 120 pass through the transflective LC panel 130 to display an image on the sub-screen Ws of the LCD device 100.

Referring to FIG. 7B, when the upper main machine 201 is turned off, a portion A of light from the first light unit 110 that has passed through the transflective LC panel 130 displays an image on the main screen Wm of the LCD device 100. At this point, an image can be displayed on the sub-screen by reflected light C.

Also, a control unit (not shown) of the mobile terminal 200 controls driving of the first and second light units 110 and 120, and the transflective LC panel 130, and controls a display mode displaying the main screen, a display mode displaying the sub-screen, and a display mode using an external light source to be selected. The mobile terminal 200 can include wired/wireless communication function.

Although embodiments have been described with reference to a number of illustrative embodiments thereof, it should be understood that numerous other modifications and embodiments can be devised by those skilled in the art that will fall within the spirit and scope of the principles of this disclosure.

For example, various variations and modifications are possible in the component parts and/or arrangements of the subject combination arrangement within the scope of the disclosure, the drawings and the appended claims. In addition, differences associated to variations and modifications in the component parts and/or arrangements should be construed to be included in the scope of the present disclosure defined by the appended claims.

INDUSTRIAL APPLICABILITY

In a display device according to an embodiment and a mobile terminal having the same, an image can be displayed on both sides using a plurality of light units and a transflective LC panel.

Also, a main screen and a sub-screen can be made to have the same size using a transflective liquid crystal panel.

Also, the quality of a sub-screen can be improved to a level of the quality of a main screen using a transflective liquid crystal panel.

Also, since an external light source can be used through two transparent light units, power consumption can be reduced.

Also, since an image call be displayed on both sides using one liquid crystal panel, manufacturing costs can be reduced in comparison with the case where two panels are used.

The invention claimed is:

1. A display device comprising;
a transflective liquid crystal panel;
a first light unit on a rear side of the transflective liquid crystal panel; and
a second light unit on a front side of the transflective liquid crystal panel,
wherein the transflective liquid crystal panel includes first and second substrates facing each other, a liquid crystal layer interposed between the first and second substrates and a plurality of pixel regions each having a reflection portion and a transmission portion on the second substrate,
wherein each of the first and second light units include a light emitting part for emitting light at one end and a light guide plate for guiding light from the light emitting part to provide the light to the transflective liquid crystal panel,
wherein the light guide plate includes a planarized surface facing the transflective liquid crystal panel and an uneven surface on an opposite side of the planarized surface, the uneven surface including prism patterns,
wherein the uneven surface of the light guide plate of the first light unit is formed on an opposite side of the first substrate of the transflective liquid crystal panel, and
wherein the uneven surface of the light guide plate of the second light unit is formed on an opposite side of the second substrate of the transflective liquid crystal panel.

2. The display device according to claim 1, wherein the transflective liquid crystal panel transmits a portion of light from the first light unit and reflects the rest of the light.

3. The display device according to claim 1, wherein the transflective liquid crystal panel transmits light incident from the second light unit.

4. The display device according to claim 1, comprising polarizers on both sides of the transflective liquid crystal panel, the polarizers having polarizing axes perpendicular to each other.

5. The display device according to claim 1, wherein the light emitting part comprises at least one of a tube shaped light emitting lamp and a light emitting diode.

6. The display device according to claim 1, wherein the prism patterns in the light guide plate of the first light unit is different from the prism patterns in the light guide plate of the second light unit.

7. The display device according to claim 1, wherein the prism patterns of the light guide plate comprise at least one of grating shaped patterns and concentric patterns separated from each other with a constant interval.

8. The display device according to claim 7, wherein the concentric patterns are arranged around at least one of one corner, the other corner, and a center region of a light incident part of the light guide plate.

9. The display device according to claim 7, wherein at least one light emitting part is disposed at a central portion of the grating shaped patterns or the concentric patterns.

10. A mobile terminal comprising:
a transflective liquid crystal panel:
a first light unit on a rear side of the transflective liquid crystal panel;
a second light unit on a front side of the transflective liquid crystal panel; and
a control unit for controlling driving of at least one of the first light unit and the second light unit to control a display mode of the transflective liquid crystal panel,
wherein the first light unit includes a first light emitting part at one end and a first light guide plate in a light emitting region of the first light emitting part,
the second light unit comprises a second light emitting part at one end and a second light guide plate in a light emitting region of the second light emitting part, the second light guide plate having prism patterns different from those of the first light guide plate,
wherein the transflective liquid crystal panel includes first and second substrates facing each other, a liquid crystal layer interposed between the first and second substrates and a plurality of pixel regions each having a reflection portion and a transmission portion on the second substrate,
wherein the uneven surface of the light guide plate of the first light unit is formed on an opposite side of the first substrate of the transflective liquid crystal panel, and
wherein the uneven surface of the light guide plate of the second light unit is formed on an opposite side of the second substrate of the transflective liquid crystal panel.

11. The mobile terminal according to claim 10, wherein the transflective liquid crystal panel transmits or reflects light from the first light unit, and transmits light from the second light unit.

12. The mobile terminal according to claim 10, wherein the control unit controls the display mode to operate in at least one of a first display mode using the first light unit, a second display mode using at least one of the first light unit and the second light unit, and a third display mode using an external light source.

* * * * *